US008446664B2

(12) United States Patent
Chen et al.

(10) Patent No.: US 8,446,664 B2
(45) Date of Patent: May 21, 2013

(54) ELECTROPHORETIC MEDIA, AND MATERIALS FOR USE THEREIN

(75) Inventors: Eva Chen, Somerville, MA (US); Richard M. Webber, Brookline, MA (US); David D. Miller, Wakefield, MA (US); Jonathan Kim Nguyen, Lexington, MA (US)

(73) Assignee: E Ink Corporation, Cambridge, MA (US)

( * ) Notice: Subject to any disclaimer, the term of this patent is extended or adjusted under 35 U.S.C. 154(b) by 92 days.

(21) Appl. No.: 13/079,180

(22) Filed: Apr. 4, 2011

(65) Prior Publication Data

US 2011/0286080 A1 Nov. 24, 2011

Related U.S. Application Data

(60) Provisional application No. 61/320,482, filed on Apr. 2, 2010.

(51) Int. Cl.
*G02B 26/00* (2006.01)
*B01J 13/18* (2006.01)

(52) U.S. Cl.
USPC .......................................... 359/296; 264/4.7

(58) Field of Classification Search
USPC ... 204/450, 600; 264/4, 4.7; 359/296; 427/162, 427/212, 213.31, 472, 473; 430/32, 35
See application file for complete search history.

(56) References Cited

U.S. PATENT DOCUMENTS

| | | |
|---|---|---|
| 3,668,106 A | 6/1972 | Ota |
| 3,792,308 A | 2/1974 | Ota |
| 3,885,964 A | 5/1975 | Nacci |
| 4,828,617 A | 5/1989 | Csillag et al. |
| 5,679,821 A | 10/1997 | Takei et al. |
| 5,789,487 A | 8/1998 | Matyjaszewski et al. |
| 5,808,783 A | 9/1998 | Crowley |
| 5,872,552 A | 2/1999 | Gordon, II et al. |
| 5,912,283 A | 6/1999 | Hashizume et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,166,711 A | 12/2000 | Odake |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |

(Continued)

FOREIGN PATENT DOCUMENTS

| | | |
|---|---|---|
| EP | 1 099 207 B1 | 3/2002 |
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |

OTHER PUBLICATIONS

NPL—International Search Report for prepared for PCT/US2011/031058 (Oct. 31, 2011).*
Kitamura, T., et al., "Electrical toner movement for electronic paper-like display", Asia Display/IDW '01, p. 1517, Paper HCS1-1 (2001).
Yamaguchi, Y., et al., "Toner display using insulative particles charged triboelectrically", Asia Display/IDW '01, p. 1729, Paper AMD4-4 (2001).

*Primary Examiner* — David N Spector
(74) *Attorney, Agent, or Firm* — David J. Cole

(57) ABSTRACT

An electrophoretic medium comprises a continuous phase and a discontinuous phase. The discontinuous phase comprises a plurality of droplets, each of which comprises a fluid and at least one charged particle disposed within the fluid and capable of moving through the fluid upon application of an electric field to the electrophoretic medium. The continuous phase surrounds and encapsulates the discontinuous phase and comprising a polymeric binder and a salt, the salt having an anion containing at least one fluorine atom and having a water solubility of at least about 0.25 per cent by weight at 25° C.

20 Claims, No Drawings

U.S. PATENT DOCUMENTS

| | | |
|---|---|---|
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,628,258 B1 | 9/2003 | Nakamura |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,724,520 B2 | 4/2004 | Kawai |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 * | 3/2006 | Honeyman et al. ........... 359/296 |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,265,895 B2 | 9/2007 | Miyazaki et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,436,577 B2 | 10/2008 | Moriyama et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner et al. |
| 7,667,684 B2 | 2/2010 | Jacobson et al. |
| 7,667,886 B2 | 2/2010 | Danner et al. |
| 7,672,040 B2 | 3/2010 | Sohn et al. |
| 7,679,599 B2 | 3/2010 | Kawai |
| 7,679,814 B2 | 3/2010 | Paolini et al. |
| 7,688,297 B2 | 3/2010 | Zehner et al. |
| 7,688,497 B2 | 3/2010 | Danner et al. |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,733,554 B2 | 6/2010 | Danner et al. |
| 7,746,544 B2 | 6/2010 | Comiskey et al. |
| 7,785,988 B2 | 8/2010 | Amundson et al. |
| 7,787,169 B2 | 8/2010 | Abramson et al. |
| 7,791,782 B2 | 9/2010 | Paolini et al. |
| 7,791,789 B2 | 9/2010 | Albert et al. |
| 7,826,129 B2 * | 11/2010 | Wu et al. ..................... 359/296 |

| Patent/Pub No. | Date | Inventor(s) |
|---|---|---|
| 7,839,564 B2 | 11/2010 | Whitesides et al. |
| 7,843,621 B2 | 11/2010 | Danner et al. |
| 7,843,624 B2 | 11/2010 | Danner et al. |
| 7,843,626 B2 | 11/2010 | Amundson et al. |
| 7,848,006 B2 | 12/2010 | Wilcox et al. |
| 7,848,007 B2 | 12/2010 | Paolini, Jr. et al. |
| 7,859,637 B2 | 12/2010 | Amundson et al. |
| 7,893,435 B2 | 2/2011 | Kazlas et al. |
| 7,898,717 B2 | 3/2011 | Patry et al. |
| 7,903,319 B2 | 3/2011 | Honeyman et al. |
| 7,910,175 B2 | 3/2011 | Webber et al. |
| 7,952,557 B2 | 5/2011 | Amundson et al. |
| 7,952,790 B2 | 5/2011 | Honeyman et al. |
| 7,956,841 B2 | 6/2011 | Albert et al. |
| 7,957,053 B2 | 6/2011 | Honeyman et al. |
| 7,986,450 B2 | 7/2011 | Cao et al. |
| 7,999,787 B2 | 8/2011 | Amundson et al. |
| 8,009,344 B2 | 8/2011 | Danner et al. |
| 8,009,348 B2 | 8/2011 | Zehner et al. |
| 8,018,640 B2 | 9/2011 | Whitesides et al. |
| 8,027,081 B2 | 9/2011 | Danner et al. |
| 8,034,209 B2 | 10/2011 | Danner et al. |
| 8,035,611 B2 | 10/2011 | Sakamoto |
| 8,035,886 B2 | 10/2011 | Jacobson |
| 8,040,594 B2 | 10/2011 | Paolini, Jr. et al. |
| 8,049,947 B2 | 11/2011 | Danner et al. |
| 8,054,526 B2 | 11/2011 | Bouchard |
| 8,064,962 B2 | 11/2011 | Wilcox et al. |
| 8,068,272 B2 | 11/2011 | LeCain et al. |
| 8,077,141 B2 | 12/2011 | Duthaler et al. |
| 8,077,381 B2 | 12/2011 | LeCain et al. |
| 8,089,453 B2 | 1/2012 | Comiskey et al. |
| 8,098,418 B2 | 1/2012 | Paolini et al. |
| 8,115,729 B2 | 2/2012 | Danner et al. |
| 8,125,501 B2 | 2/2012 | Amundson et al. |
| 8,129,655 B2 | 3/2012 | Jacobson et al. |
| 8,139,050 B2 | 3/2012 | Jacobson et al. |
| 8,169,400 B2 | 5/2012 | Shih |
| 2001/0009352 A1 | 7/2001 | Moore |
| 2002/0060321 A1 | 5/2002 | Kazlas et al. |
| 2002/0090980 A1 | 7/2002 | Wilcox et al. |
| 2002/0171620 A1 | 11/2002 | Gordon, II et al. |
| 2003/0102858 A1 | 6/2003 | Jacobson et al. |
| 2004/0105036 A1 | 6/2004 | Danner et al. |
| 2004/0119681 A1 | 6/2004 | Albert et al. |
| 2004/0263947 A1 | 12/2004 | Drzaic et al. |
| 2005/0012980 A1 | 1/2005 | Wilcox et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2006/0007194 A1 | 1/2006 | Verschueren et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0152474 A1 | 7/2006 | Saito et al. |
| 2006/0181504 A1 | 8/2006 | Kawai |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0238488 A1 | 10/2006 | Nihei et al. |
| 2006/0263927 A1 | 11/2006 | Sakurai et al. |
| 2007/0013683 A1 | 1/2007 | Zhou et al. |
| 2007/0052757 A1 | 3/2007 | Jacobson |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0195399 A1 | 8/2007 | Aylward et al. |
| 2007/0211002 A1 | 9/2007 | Zehner et al. |
| 2007/0285385 A1 | 12/2007 | Albert et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0150888 A1 | 6/2008 | Albert et al. |
| 2008/0218839 A1 | 9/2008 | Paolini, Jr. et al. |
| 2008/0220228 A1 | 9/2008 | Hattori et al. |
| 2008/0266245 A1 | 10/2008 | Wilcox et al. |
| 2008/0273132 A1 | 11/2008 | Hsu et al. |
| 2008/0291129 A1 | 11/2008 | Harris et al. |
| 2008/0309350 A1 | 12/2008 | Danner et al. |
| 2009/0004442 A1 | 1/2009 | Danner |
| 2009/0009852 A1 | 1/2009 | Honeyman et al. |
| 2009/0034057 A1 | 2/2009 | LeCain et al. |
| 2009/0046082 A1 | 2/2009 | Jacobson et al. |
| 2009/0122389 A1 * | 5/2009 | Whitesides et al. .......... 359/296 |
| 2009/0174651 A1 | 7/2009 | Jacobson et al. |
| 2009/0179923 A1 | 7/2009 | Amundson et al. |
| 2009/0195568 A1 | 8/2009 | Sjodin |
| 2009/0237773 A1 | 9/2009 | Cao et al. |
| 2009/0256799 A1 | 10/2009 | Ohkami et al. |
| 2009/0315044 A1 | 12/2009 | Amundson et al. |
| 2009/0322721 A1 | 12/2009 | Zehner et al. |
| 2010/0044894 A1 | 2/2010 | Valianatos et al. |
| 2010/0045592 A1 | 2/2010 | Arango et al. |
| 2010/0103502 A1 | 4/2010 | Jacobson et al. |
| 2010/0118384 A1 | 5/2010 | Danner et al. |
| 2010/0148385 A1 | 6/2010 | Balko et al. |
| 2010/0201651 A1 | 8/2010 | Baucom et al. |
| 2010/0207073 A1 | 8/2010 | Comiskey et al. |
| 2010/0220121 A1 | 9/2010 | Zehner et al. |
| 2010/0265239 A1 | 10/2010 | Amundson et al. |
| 2010/0283806 A1 | 11/2010 | Albert et al. |
| 2010/0289736 A1 | 11/2010 | Feick et al. |
| 2011/0012825 A1 | 1/2011 | Walls et al. |
| 2011/0026101 A1 * | 2/2011 | Wu et al. ....................... 359/296 |
| 2011/0032595 A1 | 2/2011 | Whitesides et al. |
| 2011/0069370 A1 | 3/2011 | Patry et al. |
| 2011/0075248 A1 | 3/2011 | LeCain et al. |
| 2011/0140744 A1 | 6/2011 | Kazlas et al. |
| 2011/0164301 A1 | 7/2011 | Paolini, Jr. et al. |
| 2011/0164307 A1 | 7/2011 | Paolini et al. |
| 2011/0187689 A1 | 8/2011 | Bishop |
| 2011/0310459 A1 | 12/2011 | Gates et al. |
| 2011/0310461 A1 | 12/2011 | Bouchard et al. |

* cited by examiner

ELECTROPHORETIC MEDIA, AND MATERIALS FOR USE THEREIN

REFERENCE TO RELATED APPLICATIONS

This application claims benefit of Provisional Application Ser. No. 61/320,482, filed Apr. 2, 2010.

This application is related to U.S. Pat. No. 7,012,735 and U.S. Patent Application Publication No. 2009/0122389. The entire contents of this patent and applications, and of all other U.S. patents and published and copending applications mentioned below, are herein incorporated by reference.

BACKGROUND OF INVENTION

This invention relates to electrophoretic media useful in the production of electrophoretic displays, to binders for use in such media, and to electrophoretic displays formed using such binders.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Electrophoretic displays have been the subject of intense research and development for a number of years. In a particle-based electrophoretic display, a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,202,991; 7,242,513; 7,304,634; 7,339,715; 7,391,555; 7,411,719; 7,477,444; and 7,561,324; and U.S. Patent Applications Publication Nos. 2004/0112750; 2005/0156340; 2007/0057908; 2007/0091417; 2007/0223079; 2008/0023332; 2008/0130092; 2008/0264791; 2009/0122389; and 2010/0044894;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502 and U.S. Patent Application Publication No. 2007/0109219;

(f) Methods for driving displays; see for example U.S. Pat. Nos. 7,012,600 and 7,453,445;

(g) Applications of displays; see for example U.S. Pat. No. 7,312,784 and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of displays. For example, a microcell electrophoretic medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in electrophoretic displays, and the methods used to manufacture such displays, are derived from technology used in liquid crystal displays (LCD's), which are of course also electro-optic displays, though using a liquid rather than a solid medium. For example, electrophoretic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to electrophoretic displays. Because the electrophoretic material is solid, it must be present between the backplane and the front electrode before these two integers are secured to each other. Furthermore, in contrast to a liquid crystal material, which is simply placed between the front electrode and the backplane without being attached to either, an electrophoretic medium normally needs to be secured to both; in most cases the electrophoretic layer is formed on the front electrode, since this is generally easier than forming this layer on the circuitry-containing backplane, and the front electrode/electrophoretic layer combination is then laminated to the backplane, typically by covering the entire surface of the electrophoretic layer with an adhesive and laminating under heat, pressure and possibly vacuum. Accordingly, most prior art methods for final lamination of electrophoretic displays are essentially batch methods in which (typically) the electrophoretic medium, a lamination adhesive and a backplane are brought together immediately prior to final assembly, and it is desirable to provide methods better adapted for mass production.

Electro-optic displays are often costly; for example, the cost of the color LCD found in a portable computer is typically a substantial fraction of the entire cost of the computer.

As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

The aforementioned U.S. Pat. No. 6,982,178 describes a method of assembling a solid electro-optic display (including an electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

It will readily be apparent from the foregoing discussion that an electrophoretic display is a complicated system, which may comprise (1) the electrophoretic particles themselves, which may be complex particles having a core/shell construction and/or a polymer coating; (2) the fluid surrounding the electrophoretic particles; (3) additives in this fluid, such as charge control agents, surfactants, dispersed polymers etc; (4) a capsule wall surrounding the electrophoretic particles and fluid; a binder or other continuous phase surrounding the capsules, droplets or microcells; (5) one or more adhesive layers; and (6) one or more electrode layers. Not surprisingly, in view of the complexity of this system, the exact relationship between the electro-optic properties of such a display and the mechanical, physic-chemical and electrical properties of the various materials used to form the display is only partially understood. It is for example, known that if the adhesive used in a front plane laminate has insufficient electrical conductivity, the electro-optic performance of the display may be adversely affected. The aforementioned U.S. Pat. No. 7,012,735 describes the advantage obtained by doping this adhesive with salts or other materials to improve its electrical conductivity, a preferred dopant for this purpose being tetrabutylammonium hexafluorophosphate (hereinafter "TBAHFP"). The same patent also describes the advantages of similar doping of the binder of the display with salts, including such as TBAHFP.

One of the problems that doping of the binder is designed to reduce or overcome is so-called "white state degradation" or "WSD". WSD manifests itself as a reduction of the reflectivity (typically measured as L* value in the usual CIE L*a*b* color space) of the white extreme optical state of the display during operation of the display. It has been found empirically that the amount of WSD experienced is dependent upon operating duty cycle, temperature and composition of the internal phase (electrophoretic particles plus fluid) of the electrophoretic medium. Certain electrophoretic media of the type described in U.S. Patent Application Publication No. 2010/0289736, and lacking ionic dopant in the binder, have been found to experience WSD of 2-9 L* units in the first 48 hours of operation at a 20 per cent duty cycle at 25° C. This degree of WSD is unacceptable for many applications, which require WSD not greater than about 3 L* units (and desirably considerably less) after 240 hours of operation under these conditions.

Although the addition of an ionic dopant, typically a salt, to the binder reduces WSD, the choice of an appropriate salt poses considerable difficulties. In practice, the fluids used in the internal phases of electrophoretic displays are organic materials, typically low molecular weight hydrocarbons, and the binders are polymers formed from aqueous solutions or dispersions, the most common type of binder being a polyurethane added in the form of an aqueous latex. The latex is mixed with the capsules (when such capsules are present), or the internal phase is emulsified in the latex (in the case of a polymer-dispersed electrophoretic medium). The slurry formed by the latex and the capsules or droplets is then coated on to a substrate, and the layer of slurry dried to form a coherent electrophoretic layer. At first glance it might appear that the ionic dopant should be a water-soluble salt, which can readily be added to the aqueous polymer latex in the form of an aqueous solution. However, it is found that simple, water-soluble salts such as sodium chloride are not effective in mitigating WSD; for example, addition of a molar amount of sodium chloride equivalent to 250-350 ppm of TBAHPF to the binder of an electrophoretic medium of the type described in the aforementioned 2010/0289736 gave a WSD of about 7.5 L* units after 240 hours of operation at a 20 per cent duty cycle at 25° C. Better results are achieved with some hydrophobic (water insoluble) salts; for example addition of 250-350 ppm of the TBAHFP mentioned in U.S. Pat. No. 7,012,735 gives a WSD of about 1 L* unit under the same conditions. The impact of these salts on WSD is concentration dependent, and their impact on the broader range of EO performance (including for example this film transistor (TFT) performance, image stability, and dwell state dependence) is sensitive to the concentration of other components in the slurry. Other components that apparently interact with slurry dopant to affect EO performance include Triton X100 and the solvent used to deliver the salt into solution.

Unfortunately, such water insoluble salts pose other problems. It is essential that the salt be uniformly dispersed throughout the binder, and simply dispersing the salt in water will not suffice to produce such uniform dispersion. In practice, it is necessary to dissolve the salt in an appropriate water-miscible organic solvent and add the solution of the salt in the solvent to the latex from which the binder is formed. The solvent chosen must not, of course, have any adverse effect on the capsules or droplets, the binder itself or the properties of the final dried electrophoretic layer. Appropriate solvents are in practice limited to N-methylpyrrolidone (NMP), tetrahydrofuran and acetone. It is difficult to remove all traces of the organic solvent from the electrophoretic layer during drying, since the drying conditions are limited to conditions which can be tolerated by the capsules or droplets, which contain a volatile organic fluid. Traces of organic solvents remaining in the dried electrophoretic layer or adhesive layer are known to cause serious problems; see, for example, the aforementioned 2009/0122389, which describes damage to backplanes containing organic semiconductors caused by traces of NMP remaining in the dried adhesive layer. It has also been found that traces of organic solvents remaining in the dried binder can have negative impacts on the electro-optic performance on the display; for example, such organic solvents has adversely affect white state edge, and the darkness of the dark state of the display.

Accordingly, there is a need for a method of adding ionic dopants to binders used in electrophoretic media without introducing organic solvents into the binders, and the present invention provides such a method.

SUMMARY OF INVENTION

It has now been found that certain salts which contain fluorine in the anion and have at least limited water solubility can be used as ionic dopants in the binders of electrophoretic media. These liquid salts can be added to an aqueous polymer dispersion used to form the binder as aqueous solutions; certain salts which are liquid at or near room temperature may also be added as the pure liquid salt, alt.

Accordingly, in one aspect this invention provides an electrophoretic medium comprising a continuous phase and a discontinuous phase, the discontinuous phase comprising a plurality of droplets, each of which comprises a fluid and at least one charged particle disposed within the fluid and capable of moving through the fluid upon application of an electric field to the electrophoretic medium, the continuous phase surrounding and encapsulating the discontinuous phase and comprising a polymeric binder and a salt, the salt having an anion containing at least one fluorine atom and having a water solubility of at least about 0.25 per cent at 25° C. The electrophoretic medium may be either of the encapsulated or polymer-dispersed type, i.e., there may or may not be a capsule wall between each droplet and the binder. The electrophoretic medium may also be of the microcell type. The fluorine-containing salt may be present in an amount of from about 50 to about 10,000 ppm based upon the solids content of the binder, and generally from about 100 to about 1000 ppm.

Preferred salts for use in the electrophoretic medium of the present invention are those having anions containing at least three fluorine atoms. The salt may, for example, have a hexafluorophosphate anion. The salt may also have an imidazolium cation, a specific preferred salt being 3-butyl-1-methylimidazolium hexafluorophosphate. (It should be noted that the tetrabutylammonium hexafluorophosphate mentioned in U.S. Pat. No. 7,012,735 is insufficiently water soluble to be used in the present invention.) Alternatively, the salt may have a tetrafluoroborate or trifluoromethanesulfonate (triflate) anion.

As already mentioned, the salt used in the electrophoretic medium of the present invention should have a water solubility of at least about 0.25 per cent by weight at 25° C., so that the salt can be added to the binder in the form of an aqueous solution. It is desirable that the salt have a water solubility of at least about 1.0 per cent by weight, and preferably greater, at 25° C., so that the salt can be added to the binder in the form of a 1 per cent aqueous solution; it is undesirable to add an excessive amount of water to the binder with the salt since the salt/binder mixture is normally mixed with the capsules or droplets of the internal phase of the electrophoretic medium, coated on to a substrate and then dried or otherwise exposed to conditions effective to cause formation of a coherent layer of the electrophoretic medium on the substrate. Adding an excessive amount of water to the binder with the salt may delay drying of the layer of electrophoretic medium on the substrate and is thus undesirable.

Some of the salts used in the present invention have melting points not greater than about 25° C., and are thus liquid at room temperature; for example, the aforementioned 3-butyl-1-methylimidazolium hexafluorophosphate (hereinafter "BMIHFP") is liquid at room temperature. Although such liquid salts can be dispersed directly in an aqueous polymer dispersion or latex without the use of any solvent, but it is still preferred to add such salts in the form of a dilute aqueous solution since it appears that use of an aqueous solution affords more uniform dispersion of the salt throughout the binder.

The present invention extends to an electrophoretic assembly comprising an electrophoretic medium of the present invention and an adhesive layer adhered to the electrophoretic medium. One or both of the exposed surfaces of the electrophoretic medium and the adhesive layer may be covered by a release sheet.

The electrophoretic assembly of the invention may be in the form of a front plane laminate comprising, in this order, a substrate (which may include a light-transmissive electrically-conductive layer), the electrophoretic medium, the adhesive layer and a release sheet. Alternatively, the electrophoretic assembly of the invention may be in the form of an inverted front plane laminate comprising, in this order, a substrate (which may include a light-transmissive electrically-conductive layer), the adhesive layer, the electrophoretic medium and a release sheet. A second adhesive layer may be interposed between the electrophoretic medium and the release sheet. The electrophoretic assembly of the invention may be in the form of double release sheet as described above.

The present invention also provides a process for forming an electrophoretic medium of the present invention. This process comprises forming an aqueous dispersion of a polymer; adding to the aqueous dispersion of the polymer an aqueous solution of a salt, the salt having an anion containing at least one fluorine atom and having a water solubility of at least about 0.25 per cent by weight at 25° C.; adding to the salt-containing aqueous dispersion of the polymer either capsules containing an electrophoretic internal phase or droplets of such an internal phase; coating the resultant mixture on to a substrate; and exposing the coating on the substrate to conditions effective to cause the coated dispersion to form a coherent layer of electrophoretic medium on the substrate.

DETAILED DESCRIPTION

As indicated above, the present invention provides an electrophoretic medium having a binder containing a salt with a fluorine-containing anion. It has been found that the addition of such a salt to the binder of an electrophoretic medium is effective in reducing WSD of the medium; for example addition of a molar amount of BMIHFP corresponding to 250-350 ppm of to an electrophoretic medium of the type described in aforementioned 2010/0289736 reduced the WSD of the medium from 5.4 L* units after 240 hours of operation at a 20 per cent duty cycle at 25° C. to 1.1 to 1.5 L* units. The addition of the same amounts of BMIHFP was also effective in reducing the dark state degradation ("DSD"—measured in a manner exactly parallel to WSD, except that of course DSD manifests itself as an increase in the L* value of the dark state of the medium) from 2.0 L* units to 0.5-0.9 L* units. These improvements in WSD and dark state degradation are achieved with degrading other important electro-optic characteristics of the medium, for example absolute white and dark state L* values.

As already indicated, addition of salts such as BMIHPF and TBAHPF to the binder of an electrophoretic medium has been found to be effective in controlling WSD. The use of water-soluble salts such as BMIHPF is preferred over the use of water-insoluble salts such as tetrabutylammonium hexafluorophosphate (TBAHPF) because the water-soluble salts can be delivered to the aqueous capsule slurry (i.e., a mixture of capsules and a polymeric dispersion or latex) without the addition to the slurry of organic solvents such as NMP; these solvents can be difficult to remove from the electrophoretic layer and have been shown to have negative impacts on other electro-optic performance parameters (for example, white state edge, dark state etc.).

The following Examples are now given, though by way of illustration only, to show details of particularly preferred reagents, conditions and techniques used in the present invention.

Example 1

To show the results obtained using BMIHPF and TBAHPF, a series of electrophoretic media of the type described in aforementioned 2010/0289736 were prepared. Each internal phase contained 0.03 per cent by weight of Triton surfactant (except for the medium containing 350 ppm of TBAHPF, which required 0.05 per cent by weight of the surfactant. The binders were doped with (a) no salt additive (control); (b) a molar amount of BMIHPF equivalent to 350 ppm of TBAHPF; (c) 250 ppm and (d) 350 ppm of TBAHPF. The TBAHPF was added as an NMP solution while the Single pixel experimental displays were prepared from the media and tested for WSD, white and black edge and blooming using standard test protocols. The results are shown in Table 1 below:

TABLE 1

| Dopant | WSD. | WS edge | DS edge | Blooming |
|---|---|---|---|---|
| Control | 5.4 | −3.0 | 2.1 | 1.6 |
| 350 ppm eq. BMIHPF | 1.7 | −2.7 | 4.2 | 8.0 |
| 250 ppm TBAHPF | 1.4 | −4.8 | 1.3 | 0.1 |
| 350 ppm TBAHPF | 1.0 | −5.1 | 1.4 | 5.5 |

From the data in Table 1, it will be seen that use of BMIHPF in place of TBAHPF reduced the white state edge (a measure of image ghosting in the white state) by nearly almost half, and though DS edge increased, in most uses of electrophoretic media having a lower WS edge value is more important to TFT performance. Note that although blooming performance has worsened with the use of BMIHPF, it has been demonstrated in lab and manufacturing scale experiments that the blooming scores can be reduced significantly by altering the adhesive formulation; see Table 2 below, which reports white state and dark state edge, and blooming data for single pixel experimental displays prepared using electrophoretic media similar to those used in Table 1 above, except that the Table 2 media contained 90 or 180 ppm (actual values, not TBAHPF equivalents) of BMIHPF:

TABLE 2

| Dopant | WS Edge | DS Edge | Blooming |
|---|---|---|---|
| 90 ppm BMIHPF | −2.4 | 3.4 | 5.5 |
| 180 ppm BMIHPF | −2.4 | 3.6 | 8.2 |

It was also found experimentally that electrophoretic media containing BMIHPF give better low temperature performance, as measured by the dynamic range (the difference in L* units between the extreme black and white optical states of the display) measured at 0° C., than media containing an equimolar amount of TBAHPF, as illustrated in Table 3 below, in which the surfactant content was 0.03 per cent, except for the 350 ppm TBA medium, which required 0.05 per cent:

TABLE 3

| Dopant | moles dopant/ gram slurry | Dynamic Range |
|---|---|---|
| 350 ppm BMIHPF | $9.0 \times 10^{-7}$ | 38.6 |
| 250 ppm TBAHPF | $6.4 \times 10^{-7}$ | 30.5 |
| 350 ppm TBAHPF | $9.1 \times 10^{-7}$ | 21.8 |

A further advantage of BMIPF6 in particular is that it is slightly water soluble, and can be added to the ink layer as a dilute (~1% w/w) aqueous solution.

Example 2

This Example illustrates that hexafluorophosphate, tetrafluoroborate and triflate salts can all be used with advantage in the present invention.

The experiments of Example 1 above were repeated with a wider variety of water-soluble salts. In each case, the adhesive used was a custom polyurethane adhesive of the type described in U.S. Pat. No. 7,012,735, doped with 500 ppm of TBAHPF. The results are shown in Table 4 below.

TABLE 4

| Salt | Anion | Water soluble? | WSD |
|---|---|---|---|
| 1-butyl-3-methylimidazolium hexafluorophosphate | PF6 | Yes | −1.8 |
| 1-butyl-3-methylpiperidinium hexafluorophosphate | PF6 | Yes | −2.6 |
| 1-butyl-3-methylpyridinium hexafluorophosphate | PF6 | Yes | −2.0 |
| 1-ethyl-3-methylimidazolium hexafluorophosphate | PF6 | Yes | −2.8 |
| Sodium hexafluorophosphate | PF6 | Yes | −2.3 |
| 1-butyl-3-methylimidazolium trifluoromethanesulfonate | TFMS | Yes | −3.4 |
| 1-butyl-3-methylimidazolium boron tetrafluoride | BF4 | Yes | −7 |
| 1-decyl-3-methylimidazolium hexafluorophosphate (Control) | PF6 | No | * |
| 1-butyl-3-methylimidazolium bis(trifluorosulfonyl)imide (Control) | TFMSI | No | * |
| 1-butyl-3-methylimidazolium chloride (Control) | Cl | Yes | −14 |
| Ethylammonium nitrate (Control) | NO3 | Yes | −15 |
| None (Control) | | | −11 |

* The two salts so marked were essentially insoluble in water and had to added as an NMP solution. Accordingly, the WSD figures are not comparable to those of the other salts and are not given here.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic medium comprising a continuous phase and a discontinuous phase, the discontinuous phase comprising a plurality of droplets, each of which comprises a fluid and at least one charged particle disposed within the fluid and capable of moving through the fluid upon application of an electric field to the electrophoretic medium, the continuous phase surrounding and encapsulating the discontinuous phase and comprising a polymeric binder and a salt, the salt having an anion containing at least one fluorine atom and having a water solubility of at least about 0.25 per cent by weight at 25° C.

2. An electrophoretic medium according to claim 1 wherein a capsule wall is present between each droplet and the surrounding continuous phase.

3. An electrophoretic medium according to claim 1 wherein each droplet is in direct contact with the continuous phase.

4. An electrophoretic medium according to claim 1 which is a microcell medium in which the continuous phase has the form a carrier medium having a plurality of cavities formed therein, the discontinuous phase being retained within the cavities.

5. An electrophoretic medium according to claim 1 wherein the salt has a water solubility of at least about 1 per cent by weight at 25° C.

6. An electrophoretic assembly comprising a layer of an electrophoretic medium according to claim 1 and an adhesive layer adhered to the electrophoretic medium.

7. A double release sheet comprising a layer of a electrophoretic medium sandwiched between two adhesive layer, the exposed surface of at least one adhesive layer being covered by a release sheet, wherein the electrophoretic medium is an electrophoretic medium according to claim 1.

8. A double release sheet comprising a layer of a electrophoretic medium sandwiched between two release sheets, wherein the electrophoretic medium is an electrophoretic medium according to claim 1.

9. An electrophoretic medium according to claim 1 wherein the salt is present in the binder in an amount of from about 50 to about 10,000 parts per million based upon the solids content of the binder.

10. An electrophoretic medium according to claim 9 wherein the salt is present in the binder in an amount of from about 100 to about 1000 parts per million based upon the solids content of the binder.

11. A front plane laminate comprising, in this order, a substrate, a layer of an electrophoretic medium, an adhesive layer and a release sheet, wherein the electrophoretic medium is an electrophoretic medium according to claim 1.

12. A front plane laminate according to claim 11 wherein the substrate comprises a light-transmissive electrically-conductive layer.

13. An inverted front plane laminate comprising, in this order, a substrate, an adhesive layer, a layer of an electrophoretic medium and a release sheet, wherein the electrophoretic medium is an electrophoretic medium according to claim 1.

14. An inverted front plane laminate according to claim 13 further comprising a second adhesive layer interposed between the layer of electrophoretic medium and the release sheet.

15. An electrophoretic medium according to claim 1 wherein the salt has an anion containing at least three fluorine atoms.

16. An electrophoretic medium according to claim 15 wherein the salt has a tetrafluoroborate or trifluoromethanesulfonate anion.

17. An electrophoretic medium according to claim 15 wherein the salt has a hexafluorophosphate anion.

18. An electrophoretic medium according to claim 17 wherein the salt has an imidazolium cation.

19. An electrophoretic medium according to claim 18 wherein the salt comprises 3-butyl-1-methylimidazolium hexafluorophosphate.

20. A process for forming an electrophoretic medium, which process comprises forming an aqueous dispersion of a polymer; adding to the aqueous dispersion of the polymer an aqueous solution of a salt, the salt having an anion containing at least one fluorine atom and having a water solubility of at least about 0.25 per cent by weight at 25° C.; adding to the salt-containing aqueous dispersion of the polymer either capsules containing an electrophoretic internal phase or droplets of such an internal phase; coating the resultant mixture on to a substrate; and exposing the coating on the substrate to conditions effective to cause the coated dispersion to form a coherent layer of electrophoretic medium on the substrate.

\* \* \* \* \*